C. STERN.
COMBINATION HOLDER AND STRAINER.
APPLICATION FILED FEB. 16, 1920.

1,336,491. Patented Apr. 13, 1920.

Inventor
Charles Stern
By his Attorney
Garry P. Van Wye.

UNITED STATES PATENT OFFICE.

CHARLES STERN, OF NEW YORK, N. Y.

COMBINATION HOLDER AND STRAINER.

1,336,491.   Specification of Letters Patent.   Patented Apr. 13, 1920.

Application filed February 16, 1920. Serial No. 359,011.

*To all whom it may concern:*

Be it known that I, CHARLES STERN, a citizen of the United States, residing at New York, in the county and State of New York, have invented a new and useful Combination Holder and Strainer, of which the following is a specification.

This invention relates to tea pots, and especially to means for removing the tea leaves, and, at the same time, making it easier to use the tea pot.

The invention is illustrated in the accompanying drawing, in which—

In the drawing, like numerals of reference refer to the same parts in each of the views.

Figure 1:
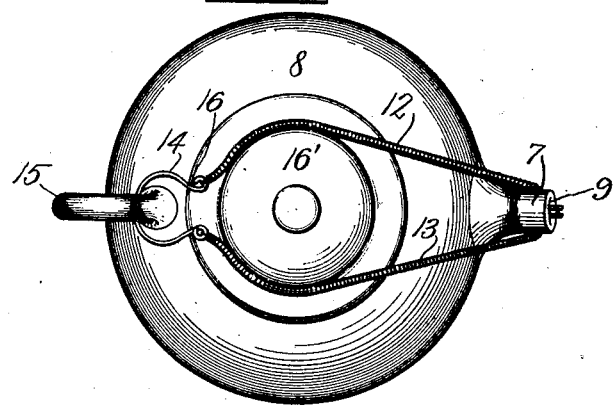
Figure 1, is a top plan view of a tea pot, with my invention applied thereto.
Figure 2:
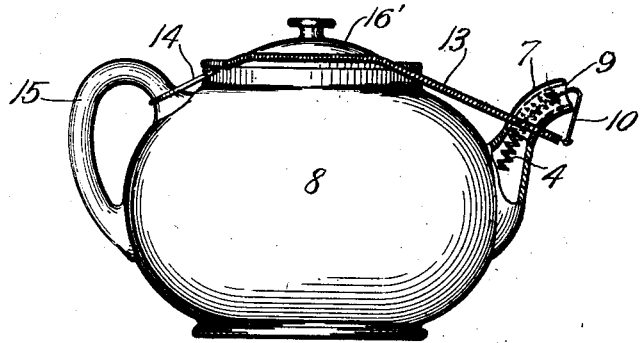
Fig. 2, is a side elevation of the same, with a part of the spout in vertical section; and, Fig. 3, is a side elevation, and an end view of the strainer.
Figure 3:
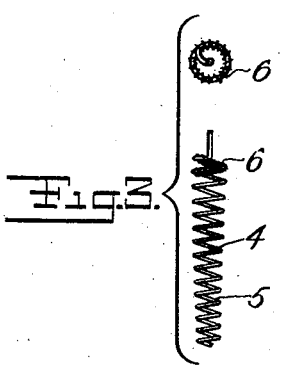

In practice I provide a strainer adapted to enter the spout of a tea pot. As shown, the strainer 4 consists of a tapered spiral spring 5, and a separate coiled spring 6 mounted on the top, or largest turn of the spring 5.

This strainer is mounted in the spout 7, of a tea pot 8, with the small end of the spiral spring directed inwardly so that the tea in flowing out of the spout will be free to flow on the outside of the spiral spring till it comes to the orifice 9 of the spout at which time the spiral spring 6 would assist the tapered spring 5 in removing the tea leaves, as will be clear.

The strainer is provided with an external projection 10 which extends downwardly from the orifice 9 of the spout 7; and connected with the lower end of this projection is an elastic device, or holder.

As shown, this elastic holder is composed of two parts 12 and 13 connected with a device 14 adapted to engage the handle 15 of the teapot 8. In the drawing the part 12 is illustrated as having a ring which may be passed over a hook 16 on the part 14. This part is immaterial, however, as it will be evident to any mechanic that both of the parts 12 and 13 might be secured to one arm of the part 14, and the part 14 might be used as a hook; or various ways might be devised of attaching the elastic parts 12 and 13 to the part 14.

The essential thing is to have an elastic part which will engage the strainer at one end and the teapot handle at the other end, and rest on top of the lid 16' of the tea pot. Thus when the strainer is in place the elastic connection between the strainer and the handle of the tea pot will prevent the lid falling off when the tea pot is tilted in pouring out the tea, as will be readily understood.

It will thus be seen that I have provided a device in which tea leaves will be effectively prevented flowing out the spout; and the lid of the tea pot will be prevented falling off when pouring the tea.

As shown, the parts 12 and 13 are made of coiled wire, this makes an elastic construction that will not be affected by heat, as will be understood. I have not limited myself to the use of wire coiled as shown; nor do I limit myself to the arrangement of the parts 12 and 13 shown. The essential features of the invention are: the strainer mounted in the spout of a teapot, and in providing means to hold this strainer in the spout. A valuable feature, also, is to provide the holding means so constructed that it will act in preventing the lid of the tea pot falling off.

As I have provided the projection 10, it is evident that a drip pad, or anything useful might be mounted on this part.

By providing the second coiled spring on a turn of the tapered spiral spring, as shown, the second spring will assist in holding the strainer in place in the spout of the teapot, by expanding and engaging the walls of the spout, as will be understood.

By providing the projection 10 effective means are provided for connection with the elastic lid holder.

I claim:

1. In combination, a teapot having a spout, lid and handle, a strainer adapted to enter the spout of said tea pot, and a holder adapted to keep said strainer in said spout and simultaneously engage and hold said teapot lid in position.

2. In combination, a teapot having a spout, lid and handle, a strainer adapted to engage said spout, a device adapted to engage said handle, and an elastic connection between said strainer and said device, said connection being adapted to engage said lid, for the purpose set forth.

3. In combination, a teapot having a spout, lid and handle, a strainer comprising a spiral spring adapted to enter said spout and having an external projection extending below the spout, a device adapted to engage said handle, and an elastic device connecting said projection and the device on the teapot handle, said elastic device being adapted to engage said lid, for the purpose set forth.

4. In combination, a teapot having a spout, lid and handle, a strainer comprising a tapered spiral spring adapted to enter said spout and having an external projection extending below the spout, a second spiral spring mounted on one turn of said tapered spring, and an elastic device connected with said projection and adapted to extend over the teapot lid and engage the handle thereof, for the purpose set forth.

5. In combination, a teapot having a spout, lid and handle, a strainer comprising a tapered spiral spring with a second spiral spring mounted on one turn thereof, and means to hold the same in the spout of a teapot comprising an elastic device in engagement with said strainer below the teapot entrance, and in engagement with the handle of the teapot over said lid.

Dated this 14th day of February, 1920.

CHARLES STERN.